March 3, 1964  F. E. BLOUNT ETAL  3,123,101
METHOD AND STRUCTURE FOR REPAIRING PIPELINES
Filed July 9, 1962
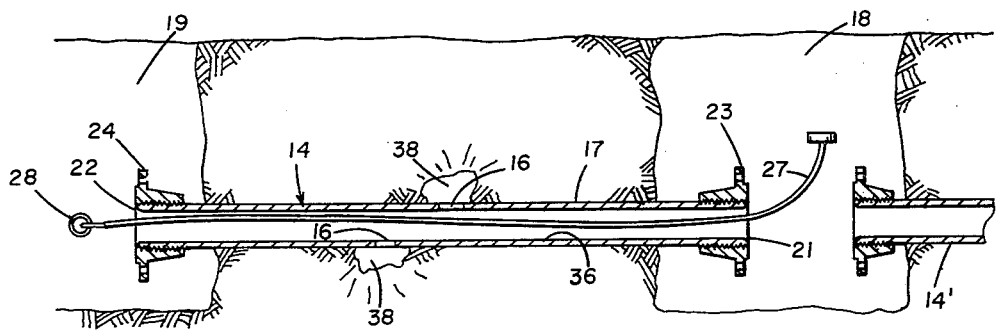
FIG. 1.
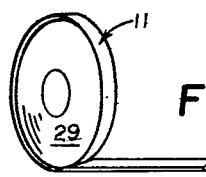
FIG. 2.
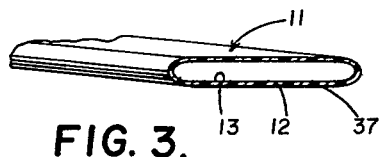
FIG. 3.
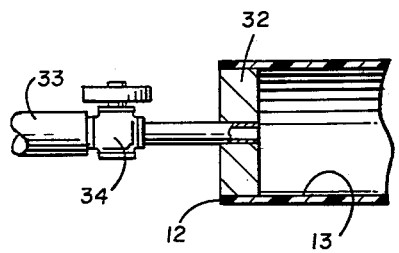
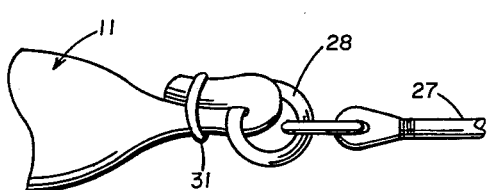
FIG. 4.
FIG. 5.
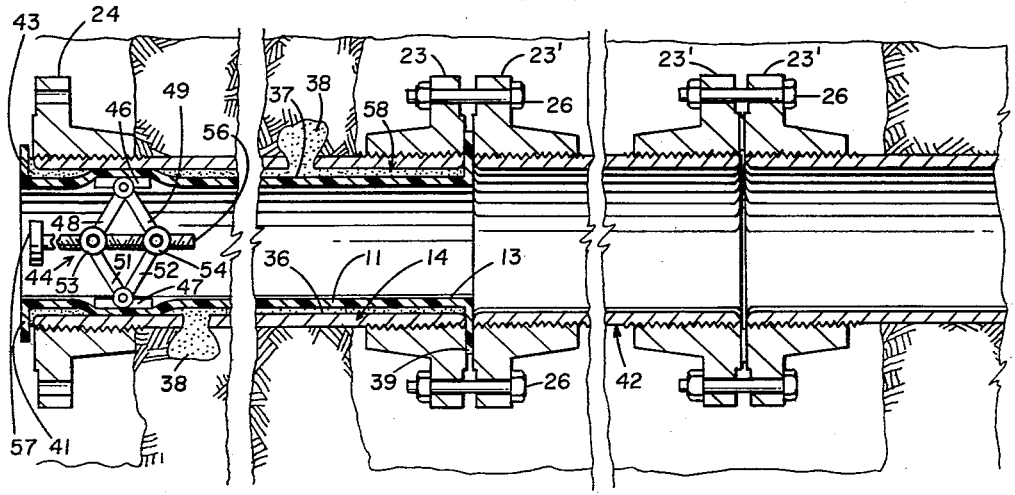

United States Patent Office 3,123,101
Patented Mar. 3, 1964

3,123,101
METHOD AND STRUCTURE FOR REPAIRING PIPELINES
Floyd E. Blount, Dallas, and Charles J. Fritts, Houston, Tex., assignors to Socony Mobil Oil Company, Inc., a corporation of New York
Filed July 9, 1962, Ser. No. 208,358
13 Claims. (Cl. 138—97)

This invention relates to a method and a structure for repairing leaking pipelines and more particularly it relates to the repair of such defective lines by installation of an impervious casing.

Pipelines are used to convey products over great distances. One example is the use of metal pipelines for conveying petroleum fluids, especially crude oil, from their source of origin to a market for their use. Such lines are usually buried beneath the surface of the earth for reasons of public safety. Further, these lines are usually located within an easement or right-of-way which may contain a plurality of such lines.

A metal pipeline is seriously damaged by apertures developing through the sidewall of the line as a result of the corrosive activity of the conveyed fluid, for example, sour crude oil. Some of the conveyed fluids are lost through such apertures. Further, the chances are great that apertures will develop over large portions of the pipeline. Pipelines fabricated of materials other than metal can also develop leaks for other reasons. When the fluid loss from a leaking line reaches a particular magnitude, for reasons of economics or otherwise, the line must be repaired or else it cannot be used.

As one method of repairing the defects in the line the defective portion of the line may, of course, be removed from its operative position and replaced with an entirely new line of the same material. However, this method is expensive, and especially so where there are several lines within one easement. Thus, this method of repair is undesirable except in extreme circumstances which warrant the expense involved.

Another method of repairing the leaking line requires the exposure and severance of the pipeline at relatively short intervals and insertion of a self-supporting rigid tubular liner into the pipeline. The lengths of liner, of necessity, are short, usually about 20 feet in length, so that they can be inserted from a working area which is disposed longitudinally from the end of the defective pipeline. The working area must be of a sufficient size that the liner can be inserted into the pipeline without damage caused by excessive flexing of the liner. This type of rigid tubular liner is relatively expensive and the costs of its installation within the defective line are great for a number of reasons. One reason is that fluid-tight joints must be made between a plurality of short individual lengths of tubing. Also, the rigid tubular liner has thick sidewalls of a tough and self-supporting material to contain the fluid pressure normally existing within the pipeline without circumferential support where it bridges voids such as corrosion-formed apertures. As a result, the tubular liner has substantially the same physical properties as the pipeline it is used to repair but with a smaller diameter flow-passageway. Thus, the entire tubular liner must be of a uniform and great strength to bridge the openings in the sidewall of the defective pipeline even though the total area of all the apertures is generally very small compared to the total interior surface area of the pipeline. This method of repairing defective pipelines is inefficient because the old pipeline is used only as an existing channel in which to contain an entirely new pipeline, i.e., the tubular liner.

It is therefore an object of the present invention to provide a method and a structure for repairing leaking pipelines that utilize the existing defective pipeline to maximum efficiency. Another object of this invention is to provide a method and a structure for repairing leaking pipelines that require only a minimum amount of exposure and severance of such defective line. Another object of this invention is to provide a method and a structure for repairing leaking pipelines using an inexpensive thin-walled impervious casing that can be flattened and packed in great lengths in compact helical rolls for convenient handling, transportation and installation. Another object of this invention is to provide a method of and a structure for using the casing of the preceding object as a fluid-proof liner supported in a novel manner within the apertured pipeline against being ruptured or displaced by fluid pressure. Another object is to provide a method and a structure for repairing leaking pipelines by inserting a thin-walled casing therein, which casing is compatible with conventional pipe flange fittings and cooperates therewith to provide a fluid-tight flow line.

These and other objects will become more apparent when read in conjunction with the following detailed description, the claims and the attached drawing wherein there is shown an illustrative embodiment of the present invention.

In the drawings which are to be read in conjunction with the instant specification and which constitute a part thereof, and wherein the same parts will be designated by like numerals in the various views:

FIG. 1 is a longitudinal vertical section of an apertured pipeline buried in the earth with small work areas excavated in spaced-apart relationship to expose such line.

FIG. 2 shows in perspective the casing of the present invention flattened and packed into a compact helical roll.

FIG. 3 is an enlarged fragmentary view of one end of the casing shown in FIG. 2.

FIG. 4 is an elevation of a length of the casing of FIG. 2, partially in section, preparatory to installing same in the pipeline of FIG. 1.

FIG. 5 is a longitudinal vertical section of the pipeline of FIG. 1 with the casing installed therein and sealed by means of flange fittings.

Referring now generally to the figures, a thin-walled casing 11 utilized in the present invention will be described before a detailed description of the method and structure for repairing a defective pipeline 14. In this description certain references will be made to specific dimensions for the purposes of illustration. However, it is to be understood that this invention can be used to repair pipelines of any size and length.

The thin-walled casing 11 is formed from an impervious resilient material having such physical properties that the casing is limp, i.e., it is non-self-supporting and is extremely flexible so that it can be folded and flattened without being damaged. Further, when the casing 11 is placed on a horizontal surface at normal ambient temperatures, its own weight will cause it to flatten to a cross-sectional configuration such as shown in FIG. 3.

Suitable materials from which the casing 11 can be constructed are the vinyl resins, which are thermoplastics. A polyvinyl chloride plastic, containing sufficient plasticizer to provide the desired physical properties in the casing manufactured from it, has been found satisfactory for the purposes of this invention. Other materials can be used which produce a casing with the desired properties. For example, the copolyvinyl chlorine-acetate thermoplastics can be used. The vinyl resin type thermoplastics, when heated to a temperature between about 250° F. to about 350° F., are sufficiently softened so that they can be readily formed into various shapes. The thermoplastics will retain their heat-formed shape upon cooling to normal ambient temperature to recover their original consistency. Further, these materials are nonreactive with water, hydrocarbons, and fats. As a result of these properties, they provide a durable liner for the defective pipeline.

The casing 11 is formed from such materials by processes well known to those skilled in the plastic tubing manufacturing art. The casing 11 is made with an outside diameter slightly smaller than the inside diameter of the defective pipeline 14 to be repaired. For example, a four-inch metal pipe may be assumed to have an inside diameter of 3⅝ inches, and the casing 11 has an outside diameter of 3½ inches with a sidewall thickness of about 1/16 inch. Thus, a four-inch metal pipe containing such casing 11 (when cylindrical) will have an annulus therebetween of an average thickness of about 1/16 inch. The casing 11 for other sizes of pipe may be made proportional to these figures. The casing 11, as seen in FIG. 3 has a very thin and flexible sidewall 12 compared to rigid plastic tubing. The sidewall 12 of casing 11 is required only to be thick enough to be impervious to fluids conveyed in the pipeline and strong enough to permit inflating the casing 11 to a cylindrical shape. Therefore, the casing 11 requires external circumferential support to contain the normal fluid pressures present within the pipeline 14. The interior surface 13 of the thermoplastic casing 11 is smooth than the usual interior surface of the pipeline 14 so that the smaller dimensioned casing 11 can carry the same amount of fluid as the original pipeline under the same flow-creating conditions.

The casing 11 may be manufacture in any length, flattened, and rolled into compact helical rolls for convenient handling, transportation, and installation. No special end fittings or joints are required for the casing 11, and it can have a uniform diameter throughout its entire length.

Referring now to FIG. 1 of the drawings, the method and structure for repairing a defective pipeline 14 of this invention will be discussed in detail. There is shown in FIG. 1 a pipeline 14 buried within the earth to a depth sufficient to provide for public safety or for other reasons. The pipeline 14 is usually buried between 3 and 6 feet beneath the surface of the earth. The pipeline 14 has one or more apertures 16 through its sidewall 17 formed as a result of the corrosiveness of the fluid conveyed therethrough, or for other reasons, through which the conveyed fluid is lost. As the first step in this invention, a desired section of the defective pipeline 14, containing the apertures 16, is isolated from the remainder of the pipeline 14' by conventional methods. For example, the pipeline 14 is exposed by excavating one or more work areas 18 and 19, which extend from the surface of the earth to adjacent the pipeline 14 and then severing the pipeline 14 from the remainder of the pipeline 14' where it is exposed. The length of the pipeline 14 to be isolated from the remainder of the pipeline 14' does not depend upon the length of the original tubular members comprising the pipeline nor upon any particular length of casing 11. For example, the length of the isolated section of the pipeline 14 shown in FIG. 1 may be 100 feet, 300 feet, or even 1000 feet. The isolated section of the pipeline 14 may be of any length, as will be more apparent from the following description. The exposed ends 21 and 22 of the isolated section of the pipeline 14 are provided with conventional flange fittings 23 and 24. It is preferred to secure the flange fittings 23 and 24 by a threaded connection but other means of securing the flanges to the pipeline 14 can be used, if desired. The isolated section of the pipeline 14 may be cleaned to remove scale or other deposits before insertion of the casing 11.

The flange fittings 23 and 24 are preferably of the type containing a raised face. This type of flange fitting is normally used with a gasket of a soft fibrous material or soft metal, which gasket extends from the flow-passageway of the pipe to adjacent the boltholes in the flange fitting. A conventional fluid-tight joint is provided when a pair of these flange fittings 23 and 23', as best seen in FIG. 5, are drawn together by bolts 26 or other means to compress a gasket between their raised faces. It is one advantage of this invention that the casing 11 used to provide a fluid-tight liner for the defective pipeline 14 also provides the soft gasket used to form a conventional fluid-tight joint to interconnect the isolated section of the pipeline 14 to the remainder of the pipeline 14'.

A pulling means, as shown in FIG. 1, is passed through the isolated section of the pipeline 14 and may be a cable 27, or the like. The cable 27 serves as a means for passing the casing 11 through the isolated pipeline section. The cable 27 is provided at one of its ends with a means for connection to any suitable prime mover of sufficient power to pull the casing 11 through the isolated section of the pipeline 14, and with a ring 28 at its other end.

As another step of this invention, there is provided a length of casing 11 in slight excess of the length of the isolated section of the pipeline 14. It is preferred that such casing 11 is obtained in a compact helical roll 29, as shown in FIG. 2, so that it may be easily transported, handled, and stored. The casing 11 is unrolled on the surface of the earth, preferably in a direction in alignment with the longitudinal axis of the isolated section of the pipeline 14 and extending away from the work area 19. As seen in FIG. 4, one end of the casing 11 is passed through the ring 28 on the cable 27, folded over, and securely tied together by means of a wire 31 or the like. The wire 31 provides a mechanical coupling to the cable 27 and also a fluid-tight seal at this end of the casing 11, as best seen in FIG. 4. Other means for sealing and anchoring such end of the casing 11 to the cable 27 can be used. A stopper 32 is inserted into the other end of the casing 11, as seen in FIG. 4, to provide a fluid-tight seal at this end. A pressurized fluid, such as compressed air, from any suitable source is passed via a fluid conduit 33 through the stopper 32 into the casing 11 and in an amount sufficient to inflate the casing 11 to a substantially cylindrical configuration, seen in FIG. 4. However, the casing 11 is not filled with such an amount of pressurized fluid that the casing 11 cannot be flexed at one or more points in a direction transverse to its longitudinal axis without being damaged. A pressure of about 5 pounds per square inch is usually satisfactory and usually can be safely contained by the unsupported casing 11. Upon inflation of the casing 11 to such conditions, a flow control valve 34 in the fluid conduit 33 is closed and the pressurized fluid source may be disconnected from the casing 11. Other means of inflating and sealing such end of the casing can be used.

As the next step of the invention, the cable 11 is moved longitudinally through the isolated section of the pipeline by means of a prime mover so that the inflated casing 11 is passed therethrough until it protrudes from both ends of the isolated section of the pipeline 14. The casing 11 is easily pulled through the isolated section of the pipeline 14 because it has a cylindrical configuration complementary to the configuration of the internal surface 36 of the pipeline 14. Further, the casing 11 can be conveyed from the surface of the earth downwardly through a small work area 18 or 19 into the isolated section of the pipeline 14 because it can be repeatedly flexed to an angle normal to the longitudinal axis of the casing without being damaged. This is an important advantage of the present invention that permits the use of very small work areas at the ends of the isolated section of the pipeline 14 for the installation therein of a fluid-tight liner.

It is preferred to lubricate the casing 11 as it is pulled through the isolated section of the pipeline 14. Any conventional lubricant may be used. Also, some means of providing for supporting the external circumferential surface of the casing 11 is required where the fluid pressure of the fluid conveyed within the pipeline 14 exceeds the pressure that can be safely contained by the unsupported casing 11. The supporting means should provide for supporting the casing 11, about its external circumferential surface, in spaced relationship from the internal surface of the pipeline, where necessary, when the casing 11 is sufficiently smaller than the pipeline 14 that it could be expanded sufficiently by fluid pressure to burst. Further, the supporting means, where necessary, should provide for supporting the casing 11 over the voids or apertures 16 in the sidewall 17 of the pipeline 14.

The following composition is preferred for use in the present invention inasmuch as it serves as a lubricant, and where necessary to provide for supporting the casing 11 about its external circumferential surface in spaced relationship from the internal surface 36 of the isolated section of the pipeline 14. Also, the composition provides for supporting the casing 11 over the voids or apertures 16 in the sidewall 17 of the pipeline 14. A preferred lubricating composition is a bentonite mud, which is a mixture of water and bentonite. Bentonite is a colloidal clay containing appreciable amounts of the clay mineral montmorillonite. Montmorillonite has an ability to swell by the absorption of water and is composed principally of aluminum and silicates, usually with some magnesium and iron. Bentonite is commercially used as an ingredient in oil well drilling muds. The bentonite is mixed with sufficient water to provide a mud having a weight of between about 9 and about 10 pounds per gallon. This bentonite mud has thixotropic properties, i.e., it forms gels on standing, and if it is allowed to lose water, it will form a tough nonyielding mud cake. The gels that are formed on standing have relatively high gel strengths, but they readily become fluids upon subjected to sufficient force to overcome their yield point. The physical state of the mud may be repeatedly changed from a gel to a fluid as long as sufficient water remains to hydrate the clay.

The bentonite mud is applied to the side exterior surface 37 of the casing 11 as it is passed through the isolated section of the pipeline 14. Additionally, it is preferred to add a quantity of the bentonite mud into the isolated section of the pipeline 14 prior to passing the casing 11 therethrough. Such quantity of bentonite mud is preferably sufficient to fill the small annulus between the casing 11 and the isolated section of the pipeline 14, apertures 16, and any voids or cavities 38 in the earth about the sidewall 17 of the isolated section of the pipeline 14.

Referring to FIG. 4, it will be seen that the end of the casing 11 secured to the cable 27 is tapered as a result of the method used to seal and anchor the same to the cable 27. This tapered shape of the casing 11 distributes the bentonite mud uniformly about the annulus between the casing 11 and the isolated section of the pipeline 14. Further, it assists in forcing the bentonite mud through the apertures 16 in the sidewall 17 of the said section of the pipeline 14 and into any voids or cavities 38 formed in the earth adjacent such apertures 16.

When the casing 11 is in place and at rest, the bentonite mud gels and holds the casing 11 in circumferential spaced relationship within the isolated section of the pipeline 14. In this manner, there is provided a complete external circumferential support for the casing 11 so that it can contain the normal fluid pressure within the pipeline 14 without rupturing and without being displaced by fluid pressure. Further, the bentonite mud in the apertures 16 and crevices 38 about the sidewall 17 of the isolated section of the pipeline 14 is forced into communication with the earth surrounding the isolated section of the pipeline 14. Water is lost from the bentonite mud into the earth it contacts so that the portion of the bentonite mud immediately adjacent the earth is converted from the gel form into a rigid nonyielding physical form most commonly known as a mud cake or filter cake. Thus, all of the apertures 16 and the cavities 38 in the earth about the sidewall 17 of the isolated section of the pipeline 14 are filled by such bentonite mud in a mud cake form to provide an unyielding support or bridge over the former unsupported areas. As a result, the thin-walled casing 11 of the present invention can safely bridge voids in the sidewall 17 of the isolated section of the pipeline 14 to operably contain fluid pressure encountered during normal pipeline operation.

It has been found desirable to add antioxidants to the bentonite mud to reduce the corrosion to the metallic pipeline in future use. The addition of small amounts of sodium dichromate or sodium metaphosphate or mixtures thereof will provide suitable antioxidants in the mud. More specifically, either or both of such antioxidants when added to the mud in an amount of about 250 parts per million (hereinafter abbreviated p.p.m.) provide satisfactory protection.

Other compositions that are adapted to provide lubricating and supporting functions equivalent to those disclosed for the bentonite mud can be used. However, the bentonite mud is preferred because it is stable, inexpensive, and readily available in the field. Other additives can be added to the bentonite mud that do not significantly change the gel strength or yield point.

With the casing 11 in a position where it extends beyond the ends of the isolated section of the pipeline 14, the seals from both ends of the casing are removed. The seals are most easily removed by cutting the casing 11 adjacent the flange fittings 23 and 24 on the isolated section of the pipeline 14 and leaving the casing 11 protruding therefrom in a length at least equal to the radial width of the facing on the flange fittings 23 and 24. One end of the casing 11 is anchored to the isolated section of the pipeline 14 by any convenient anchoring means.

Deviating from the detailed description of the method of this invention, an illustrative embodiment of an anchoring means provided by a double screw toggle press 44 will be given. The press 44, as can be seen in FIG. 5, is comprised of a pair of wall-engaging shoes 46 and 47 connected by toggle links 48, 49, 51, and 52. Links 48 and 49 are pivoted to shoe 46 and links 51 and 52 are pivoted to shoe 47. The links 48 and 51 are pivoted to a nut 53 and the links 49 and 52 are pivoted to a nut 54. A double-threaded screw 56 is threaded through the nuts 53 and 54. The screw 56 has threads at one end that are left-handed and at its other end that are right-handed. Thus, turning the screw 56 by means of operating handle 57 in one direction causes the shoes 46 and 47 to expand. Reverse rotation of the screw 56 retracts the shoes 46 and 47.

The press 44 is inserted into the casing 11 while it is in tension, and operated to urge the shoes 46 and 47 outwardly so that the sidewall of the casing 11 is pressed into nonslipping engagement with the inner surface of the pipeline 14.

The detailed description of the method of this invention will now be continued. The other end of the casing 11 is pulled longitudinally out of the isolated section of the pipeline 14 by application of sufficient force thereto to convert the bentonite mud from a gel to a fluid by exceeding the yield point of the bentonite mud. The casing 11 is moved outwardly through a sufficient distance to place the casing 11 into a slight tension. The free end of the casing 11 is then anchored to the isolated section of the pipeline 14 by a suitable anchor means such as the double screw toggle press 44 previously mentioned. The ends of the casing 11 are heated and formed radially outwardly to provide flanged portions 39 and 41. These flanged portions 39 and 41 serve as a flange gasket with the flange fittings 23 and 24 on the ends of the isolated section of the pipeline 14 and the flange fittings carried by the remainder of the pipeline 14' adjacent thereto, as shown in FIG. 5. Any convenient means may be used for providing such flanged portions 39 and 41 on the casing 11. One example of such means is the Flanging Tool shown in the U.S. Letters Patent No.

2,823,418. The anchor means are removed from the end of the casing 11 and the contraction of the casing 11 moves the flanged portions 39 and 41 into abutment with the raised face of the flange fittings 23 and 24, respectively, on the isolated section of the pipeline 14.

Referring to FIG. 5, the isolated section of the pipeline 14 is connected to the remainder of the pipeline 14' at each end by means of an interconnecting spool 42 which is provided with a mating flange 23' to sandwich the flanged portion 39 of the casing 11 against the flange fitting 23 carried by the isolated section of the pipeline 14 to provide a fluid-tight connection therebetween. A similar connection (not shown) is used to seal flange fitting 24 and the flanged portion 41 of casing 11 with the remainder of pipeline 14'. Thus, the casing 11 provides a fluid-tight connection through the portion of the pipeline 14 which was defective to the remainder of the pipeline 14'. The casing 11 is compatible with conventional pipe flange fittings and cooperates therewith to provide a fluid-tight flow line.

The structure of the repaired pipeline, as seen in FIG. 5, has the limp thin-walled impervious casing 11 positioned in the defective portion of pipeline 14 with joint means sealing the casing 11 at each of its ends to the ends of the defective portion of the pipeline and also to the remainder of the pipeline 14'. A mud composition 43 formed of a mixture of water and a thixotropic hydrated clay is interposed in the annulus 58, i.e., the exterior surface 37 of the casing 11 and the interior surface 36 of the defective pipeline 14. Further, the mud composition 43 fills any voids or apertures 16 through the sidewall 17 of the pipeline 14 and any cavities 38 in the earth. Such structure restores the pipeline to full fluid conveying service with only a minimum of expense and effort.

The casing 11 is readily removed from the pipeline 14, when desired, after the flange fittings 23 and 23' and those on the other end sealing the flanged portion 41 of casing 11 to flange fitting 24 are uncoupled and the flanged portions 39 and 41 of the casing 11 exposed. The casing 11, while the surrounding mud retains its thixotropic properties, can be pulled from the pipeline 14 by application of a longitudinal force at one end of casing 11 to exceed the yield point of the mud and, as a result, to convert the mud from its gel form to its fluid form.

In the instances where the mud is permanently solid and nonyielding, for example, as a mud cake, or for other reasons, the casing 11 can be removed by an alternate procedure. One of the exposed ends of the casing 11 is sealed and a washing fluid, such as water, is injected into the annulus 58 between the casing 11 and the pipeline 14. The washing fluid collapses the casing 11 and very quickly removes the mud 43 from the annulus 58. After washing the casing 11 free of the mud 43, it can readily be pulled from the pipeline 14. Thus, the casing 11 can be removed from the pipeline 14 as easily as it was installed in such pipeline.

From the foregoing, it will be seen that a method and a structure for repairing defective pipelines have been provided that achieve all the stated objects of the present invention. While illustrative embodiments of the present invention have been fully described, it will be understood that various changes may be made by those skilled in the art without departing from the spirit of the invention. Such changes are intended to be protected by this Letters Patent in all forms of the invention falling within the scope of the following claims.

What is claimed is:

1. A method of repairing a pipeline comprising the steps of isolating a section of said pipeline to be repaired, securing flange fittings to the ends of said isolated pipeline section, providing a limp thin-walled casing of a length in excess of the length of the isolated pipeline section, providing a substantially fluid-tight seal at one end of the casing, inflating said casing by introducing pressurized fluid through the other end of said casing in a sufficient amount so that the casing is cylindrical and sealing such end against fluid loss, then passing the inflated casing through the isolated pipeline section until the casing protrudes from both ends of the isolated pipeline section, removing the seals from both ends of the casing, forming on each of the ends of said casing a flanged portion that extends radially outwardly with respect to the isolated pipeline section to provide a flange gasket residing against the face of the flange fittings, and connecting the remainder of the pipeline to the isolated pipeline section by means of mating flange fittings which sandwich the casing flanged portions against the flange fittings carried by the isolated pipeline section to provide a fluid-tight connection therebetween.

2. The method of claim 1 including the step of lubricating the inflated casing as it is passed through the isolated pipeline section with a composition comprising a mixture of a bentonite mud having a mud weight of between about 9 and about 10 pounds per gallon, and about 250 p.p.m. of sodium dichromate and about 250 p.p.m. of sodium metaphosphate.

3. The method of claim 2 including the step of introducing a quantity of said mud composition into said isolated pipeline section prior to passing the casing therethrough and in an amount sufficient to fill the annulus between the casing and isolated pipeline section and any openings through the sidewall of the isolated pipeline section.

4. A method of repairing a pipeline comprising the steps of isolating a section of said pipeline to be repaired, securing flange fittings to the ends of said isolated pipeline section, providing a limp thin-walled casing of a thermoplastic material and having a length in excess of the length of the isolated pipeline section, providing a substantially fluid-tight seal at one end of the casing, inflating said casing by introducing a pressurized fluid through the other end of said casing in a sufficient amount so that the casing is cylindrical and sealing such end against fluid loss, pulling said inflated casing through the isolated pipeline section until the inflated casing protrudes from both ends of the isolated pipeline section by a pulling means connected to one of the sealed ends of the casing and extending through said isolated pipeline section to a prime mover, removing the seals from both of the sealed ends of the casing, forming on each of the ends of said casing a flanged portion that extends radially outwardly with respect to the isolated pipeline section to provide a flange gasket residing against the face of the flange fittings, and connecting the remainder of the pipeline to the isolated pipeline section by means of mating flange fittings which sandwich the casing flanged portions against the flange fittings carried by the isolated pipeline section to provide a fluid-tight connection therebetween.

5. The method of claim 4 including the step of lubricating the inflated casing as it is pulled through the isolated pipeline section with a bentonite mud.

6. The method of claim 4 including the step of lubricating the inflated casing as it is pulled through the isolated pipeline section with a bentonite mud having a mud weight of between about 9 and about 10 pounds per gallon.

7. The method of claim 4 including the step of lubricating the inflated casing as it is passed through the isolated pipeline section with a composition comprising a mixture of a bentonite mud having a mud weight of between about 9 and about 10 pounds per gallon, and about 250 p.p.m. of sodium dichromate and about 250 p.p.m. of sodium metaphosphate.

8. The method of claim 7 including the step of introducing a quantity of the mud into said isolated pipeline section prior to passing the casing therethrough and in an amount sufficient to fill the annulus between the casing and isolated pipeline section and any openings through the sidewall of the isolated pipeline section.

9. A method of repairing a pipeline comprising the steps of isolating a section of said pipeline to be repaired, securing flange fittings to the ends of said isolated pipeline section, providing a limp thin-walled casing of a thermoplastic material and having a length in excess of the length of the isolated pipeline section, providing a substantially fluid-tight seat at one end of the casing, inflating said casing by introducing a pressurized fluid through the other end of said casing in a sufficient amount so that the casing is cylindrical and sealing such end against fluid loss, pulling said inflated casing through the isolated pipeline section until the inflated casing protrudes from both ends of the isolated pipeline section by a pulling means connected to the first-mentioned sealed end of the casing and extending through said isolated pipeline section to a prime mover, removing the seals from both of the sealed ends of the casing, anchoring one end of the casing to the isolated pipeline section, pulling the other end of the casing longitudinally out of said isolated pipeline section a sufficient distance to place said casing in tension, anchoring the free end of the casing to the isolated pipeline section, forming on each of the ends of said casing a flanged portion that extends radially outwardly with respect to the isolated pipeline section to provide a flange gasket, said flanged portions spaced from the face of the flange fittings on the isolated pipeline section a total distance less than the distance the casing was pulled to place same in tension, freeing the ends of the casing whereby the contraction of the casing moves the flanged portions thereon into abutment with the faces of the flange fittings on the isolated pipeline section, and connecting the remainder of the pipeline to the isolated pipeline section by means of mating flange fittings which sandwich the casing flanged portions against the flange fittings carried by the isolated pipeline section to provide a fluid-tight connection therebetween.

10. A structure for a casing-lined pipeline buried beneath the surface of the earth and having interval with at least one aperture through the sidewall of the pipeline comprising a limp thin-walled casing positioned in the apertured interval of the pipeline, said casing being impervious to fluids and having a sidewall which requires external circumferential support to contain the normal fluid pressure within the pipeline, joint means sealing the casing at its ends to the apertured interval of the pipeline and to the remainder of the pipeline, and a composition comprising a mixture of water and a thixotropic hydrated clay interposed between the exterior surface of the casing and the interior surface of the pipeline and filling said at least one aperture through the sidewall of the pipeline.

11. The structure of claim 10 wherein the composition comprises a mixture of bentonite and water.

12. The structure of claim 10 wherein the composition comprises a mixture of a bentonite mud having a mud weight of between about 9 and about 10 pounds per gallon and an antioxidant selected from the group consisting of sodium dichromate and sodium metaphosphate.

13. A method of repairing a pipeline comprising the steps of isolating a section of said pipeline to be repaired, providing a limp thin-walled casing of a length in excess of the length of the isolated pipeline section, providing a substantially fluid-tight seal at one end of the casing, inflating said casing by introducing pressurized fluid through the other end of said casing in a sufficient amount so that the casing is cylindrical and sealing such end against fluid loss, then passing the inflated casing through the isolated pipeline section until the casing protrudes from both ends of the isolated pipeline section, removing the seals from both ends of the casing, and leaving said casing in said pipe.

References Cited in the file of this patent

UNITED STATES PATENTS

| | | |
|---|---|---|
| 684,477 | McKinley | Aug. 23, 1904 |
| 1,548,012 | Dunn | July 28, 1925 |
| 2,214,226 | English | Sept. 10, 1940 |
| 2,290,333 | Johnson | July 21, 1942 |

FOREIGN PATENTS

| | | |
|---|---|---|
| 810,400 | Great Britain | Mar. 18, 1959 |

UNITED STATES PATENT OFFICE
CERTIFICATE OF CORRECTION

Patent No. 3,123,101            March 3, 1964

Floyd E. Blount et al.

It is hereby certified that error appears in the above numbered patent requiring correction and that the said Letters Patent should read as corrected below.

Column 2, line 65, for "chlorine-acetate" read -- chloride-acetate --; column 3, line 25, for "smooth" read -- smoother --; line 29, for "manufacture" read -- manufactured --; column 9, line 1, for "pileline" read -- pipeline --; line 7, for "seat" read -- seal --; line 38, after "having" insert -- an --; column 10, line 34, for "684,477" read -- 768,477 --.

Signed and sealed this 20th day of October 1964.

(SEAL)
Attest:

ERNEST W. SWIDER
Attesting Officer

EDWARD J. BRENNER
Commissioner of Patents